(No Model.)

W. N. BLAKEMAN, Jr.
METHOD OF AND APPARATUS FOR PRESERVING GREEN FOOD.

No. 350,287. Patented Oct. 5, 1886.

WITNESSES:
C. F. Post
Francis P. Reilly

INVENTOR
Wm. N. Blakeman Jr.
by
P. N. Voorhees
ATTORNEY

UNITED STATES PATENT OFFICE.

WILLIAM N. BLAKEMAN, JR., OF NEW YORK, N. Y.

METHOD OF AND APPARATUS FOR PRESERVING GREEN FOOD.

SPECIFICATION forming part of Letters Patent No. 350,287, dated October 5, 1886.

Application filed May 24, 1886. Serial No. 203,068. (No model.)

*To all whom it may concern:*

Be it known that I, WILLIAM N. BLAKEMAN, Jr., of the city of New York, in the county and State of New York, have invented a new and useful Improvement in the Method of and Apparatus for Preserving Green Food and Fodder-Crops in their Succulent Condition, which invention or improvement is fully set forth and illustrated in the following specification and accompanying drawings.

The object of this invention is to prevent fermentation and decay in such food materials when packed in pits or caches—such as one generally terms "silos"—and thus to retain the normal feeding value of such food as in its fresh state.

The invention consists in the process or method of imparting artificial heat to such food materials when packed or while being packed in silos, and also in an apparatus for supplying such heat, as will be hereinafter more particularly set forth and claimed.

Figure 1:
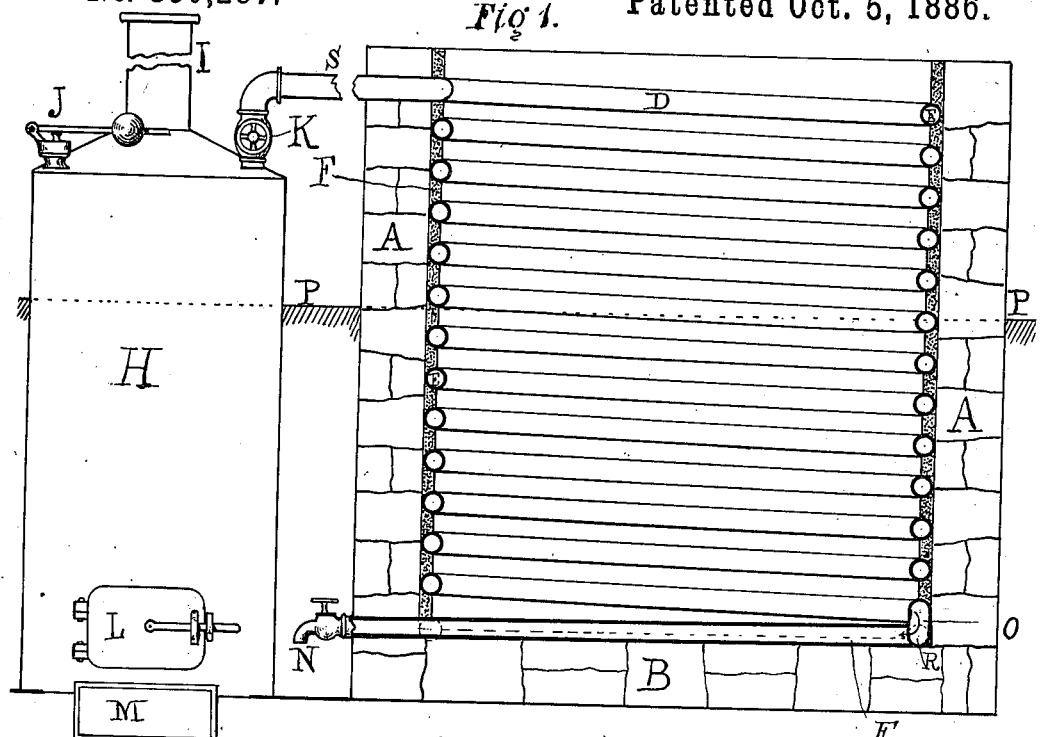
Figure 2:
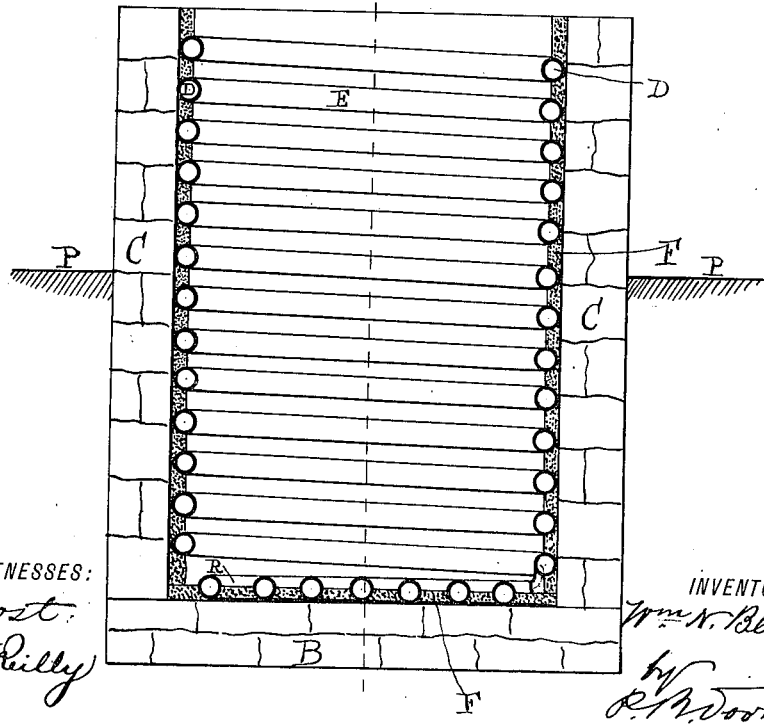

In the accompanying drawings, Figure 1 shows an ordinary steam-boiler in front elevation and a silo in longitudinal sectional elevation provided with circulating steam-pipes connected to said boiler. Fig. 2 is a cross-sectional elevation taken through Fig. 1 at about the center of its length.

In said figures the several parts of the apparatus illustrated are indicated by letters, as follows:

The letters A A indicate the end walls of a silo; B, the bottom, and C C the longitudinal walls of the same; D D, longitudinal steam-pipes, and E E transverse steam-pipes surrounding the inner walls of said silo and partly embedded in cement F, lining said walls.

H indicates any ordinary or suitable steam-boiler connected by the pipe S, provided with a stop-valve, K, to the pipes D, and through them to the system of pipes before mentioned, terminating in the drip-cock N. The boiler H is provided with a chimney, I, an ordinary safety-valve, J, furnace-door L, and ash-pit M. At the bottom of the circulating steam-pipes the pipe R forms a common pipe, from which the bottom pipes discharge to a similar bottom pipe in common, out of which all the water of condensation is discharged through the drip-cock N.

The letter P indicates the level of the surface of the ground, the boiler and silo being set partially below said surface.

Before explaining the precise action of the apparatus above described, brief mention will be made of the theory upon which it works and of the evils which it is designed to prevent.

Silos have long been used for the storing of green-fodder crops under pressure; but the fermentation in the mass, which has always occurred, rapidly changes and deteriorates the quality of the material for food purposes. Upon investigation it has been discovered that such fermentations and putrefactions and decay are the results of the action of living organisms existing in the atmosphere, which multiply with enormous rapidity when the conditions of their environment are favorable. This action by such germs may be neutralized and the germs themselves killed by the action of heat, provided, of course, that the degree of heat be raised above that developed by such fermentation itself, which, under favorable conditions, may rise to from 145° to 155° Fahrenheit. The silo, therefore, being constructed of masonry, concrete, or wood, and above or below the ground, either entirely or partly, as now commonly practiced, and in such substantial manner as to be air-tight, the artificial heat may be applied in different ways; but an arrangement of heating-pipes in the bottom of the silo will be found the most economical. Such pipes may, however, be placed like a coil or worm, or like the arrangement shown in the accompanying drawings, covering the bottom and sides alike of the pit or receptacle. The heating apparatus being thus suitably arranged, steam from the boiler H is admitted, through the stop-valve K, to the system of pipes, and after said pipes are warmed up and the water of condensation expelled through the drip-cock N said cock is closed or nearly closed to admit of more or less rapid circulation of the steam through the pipes. While this operation is going on the material to be preserved in the silo is delivered therein from above as rapidly as may be convenient until its capacity of storage has been reached, when the cover should be placed thereon, of the usual description or character, consisting of straw, hay, bran, sawdust, or some such materials, pressed upon by boards or poles for a top bearing-surface for the necessary weights commonly used, so that the contents of the silo may be pressed into a compact mass and kept from the action of new germs in the external atmosphere. The silo having been thus filled, covered, and weighted, the heat may be discontinued by shutting off the steam, or said heat may be continued longer, the object being, of course, to remove the atmospheric germs, both by driving them out with the air expelled by the heat, as well as to kill such as may remain by the direct effect of the heat upon them. Proper care, of course, must be taken not to raise the temperature high enough to injure or desiccate the food, or the object intended will be defeated.

I do not confine myself to the precise method of heating by the steam-pipes above described, as the heating may be effected by discharging the steam directly into the contents of the silo from perforated pipes, or under and up through a perforated or false bottom. The silo may also be double-cased, with an air-space on sides and bottom, to be used as a heating-jacket, and hot air supplied from a furnace may be substituted for steam from a boiler without departing from the principle of my process.

Of course it is desirable that whatever material be used for the heating pipes or jackets where in contact with the green-food crops or their juices, such material should be non-corrosive by such juices, or protected by some non-corrosive coating. Said pipes or jackets should also be made of sufficient strength and rigidity to sustain the weight and pressure of the packed contents of the silo, and also of sufficient strength and hardness, where exposed, to stand the ordinary wear and tear that may be expected from the occasional blows and abrasions of the tools used in digging or removing the ensilage from the silo.

Having thus fully described my said process, as of my invention I claim—

1. The hereinbefore-described method or process of preserving green food or fodder crops, consisting in storing the same in pits or silos under pressure, and subjecting the same to artificial heat, substantially as described, at a temperature above that which would be generated by their fermentative processes, whereby such foods are retained in their succulent condition at their normal feeding value, substantially as and for the purposes set forth.

2. A pit or silo for the preservation of ensilage, constructed with pipes or passages, substantially as described, for applying artificial heat to said silo, whereby its contents may be preserved from destructive fermentative processes, substantially as and for the purposes set forth.

WM. N. BLAKEMAN, JR.

Witnesses:
FRANCIS P. REILLY,
JENNIE TURNER.